(12) United States Patent
Malausa et al.

(10) Patent No.: US 12,172,119 B2
(45) Date of Patent: Dec. 24, 2024

(54) FILTER CARTRIDGE FOR A FILTER ASSEMBLY, FILTER ASSEMBLY AND DOMESTIC APPLIANCE WITH A FILTER ASSEMBLY

(71) Applicant: ELECTROLUX APPLIANCES AKTIEBOLAG, Stockholm (SE)

(72) Inventors: Andrea Malausa, Santa-Lucia-di-Piave (IT); Matteo Simioni, Santa-Lucia-di-Piave (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 402 days.

(21) Appl. No.: 17/631,049

(22) PCT Filed: Jul. 15, 2020

(86) PCT No.: PCT/EP2020/070051
§ 371 (c)(1),
(2) Date: Jan. 28, 2022

(87) PCT Pub. No.: WO2021/018597
PCT Pub. Date: Feb. 4, 2021

(65) Prior Publication Data
US 2022/0258093 A1 Aug. 18, 2022

(30) Foreign Application Priority Data
Jul. 31, 2019 (EP) .................................. 19189341

(51) Int. Cl.
*B01D 46/00* (2022.01)
*B01D 46/10* (2006.01)
(Continued)

(52) U.S. Cl.
CPC ......... *B01D 46/88* (2022.01); *B01D 46/0006* (2013.01); *B01D 46/0036* (2013.01);
(Continued)

(58) Field of Classification Search
CPC B01D 46/88; B01D 46/0006; B01D 46/0036; B01D 46/10; B01D 2265/026;
(Continued)

(56) References Cited

U.S. PATENT DOCUMENTS 2,758,667 A * 8/1956 Brace ...................... A47L 5/362
55/362
4,323,378 A * 4/1982 Miljoen .................. B01D 46/02
24/456
(Continued)

FOREIGN PATENT DOCUMENTS

CN 108554176 9/2018
EP 2476979 7/2012
(Continued)

OTHER PUBLICATIONS

English translation of Chinese Office action for application No. 202080068943.1 dated Feb. 28, 2023, 9 pages.
(Continued)

*Primary Examiner* — Frank M Lawrence, Jr.
(74) *Attorney, Agent, or Firm* — Pearne & Gordon LLP

(57) ABSTRACT

There is described a filter assembly (2) comprising a filter housing (15) and a removable filter cartridge (16) arranged and/or arrangeable within the filter housing (15). The filter assembly (2) comprises an expelling device configured to exert an expelling force onto the filter cartridge (16) when being arranged within the filter housing (15) for at least partially directing the filter cartridge (16) out of the filter housing (15) and a control device controllable into a locking configuration for blocking the filter cartridge (16) within the filter housing (15) and/or for counter-acting against the expelling force and an unlocking configuration for allowing the expelling force to at least partially expel the filter cartridge (16) from the filter housing (15). The control device comprises at least a first interaction element (20) and
(Continued)

a second interaction element (21) interacting and/or being configured to interact with one another with the control device being controlled into the locking configuration. The first interaction element (20) and the second interaction element (21) are configured such that the interaction between the first interaction element (20) and the second interaction element (21) is interrupted and/or released with the control device being controlled into the unlocking configuration and the filter cartridge (16) is provided with the first interaction element (20) and the filter housing (15) is provided with the second interaction element (21).

17 Claims, 4 Drawing Sheets

(51) Int. Cl.
*B01D 46/88* (2022.01)
*F25D 17/04* (2006.01)

(52) U.S. Cl.
CPC ............ *B01D 46/10* (2013.01); *F25D 17/042* (2013.01); *B01D 2265/026* (2013.01); *B01D 2265/028* (2013.01); *F25D 2317/0415* (2013.01)

(58) Field of Classification Search
CPC ............ B01D 2265/028; F25D 17/042; F25D 17/025; F25D 2317/0415
USPC .......... 55/478, 480, 481, 490, 493, 506, 507
See application file for complete search history.

(56) References Cited

U.S. PATENT DOCUMENTS

| | | | | |
|---|---|---|---|---|
| 4,428,480 | A * | 1/1984 | Ackeret | G11B 23/0233 312/333 |
| 5,571,300 | A * | 11/1996 | Stemmer | B01D 46/10 55/DIG. 39 |
| 6,007,169 | A * | 12/1999 | Li | H05K 7/1425 312/319.1 |
| 6,214,074 | B1 * | 4/2001 | Silviera | F24F 8/108 55/471 |
| 7,833,300 | B2 * | 11/2010 | Taniuchi | E02F 9/0866 55/480 |
| 7,929,300 | B1 * | 4/2011 | Bisbikis | B01D 46/0009 55/497 |
| 8,157,882 | B2 * | 4/2012 | Curtis | F25D 17/042 55/497 |
| 8,727,842 | B2 | 5/2014 | Pfannenberg | |
| 2008/0045133 | A1 | 2/2008 | Pfannenberg | |
| 2008/0216455 | A1 * | 9/2008 | Aizawa | B01D 46/521 55/481 |
| 2016/0296870 | A1 * | 10/2016 | Mckechnie, IV | B01D 46/10 |

FOREIGN PATENT DOCUMENTS

| | | |
|---|---|---|
| EP | 2683997 | 1/2014 |
| EP | 3276273 | 1/2018 |
| WO | 2018099453 | 6/2018 |
| WO | 2019029888 | 2/2019 |

OTHER PUBLICATIONS

International Search Report for PCT/EP2020/070051 dated Mar. 10, 2021, 7 pages.

* cited by examiner

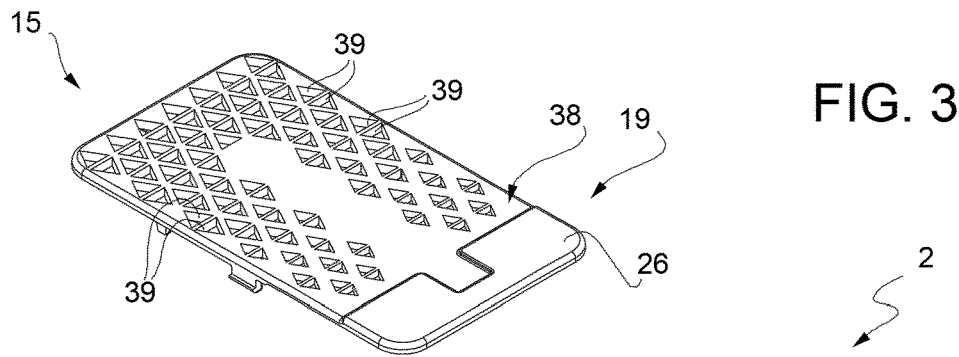
FIG. 3
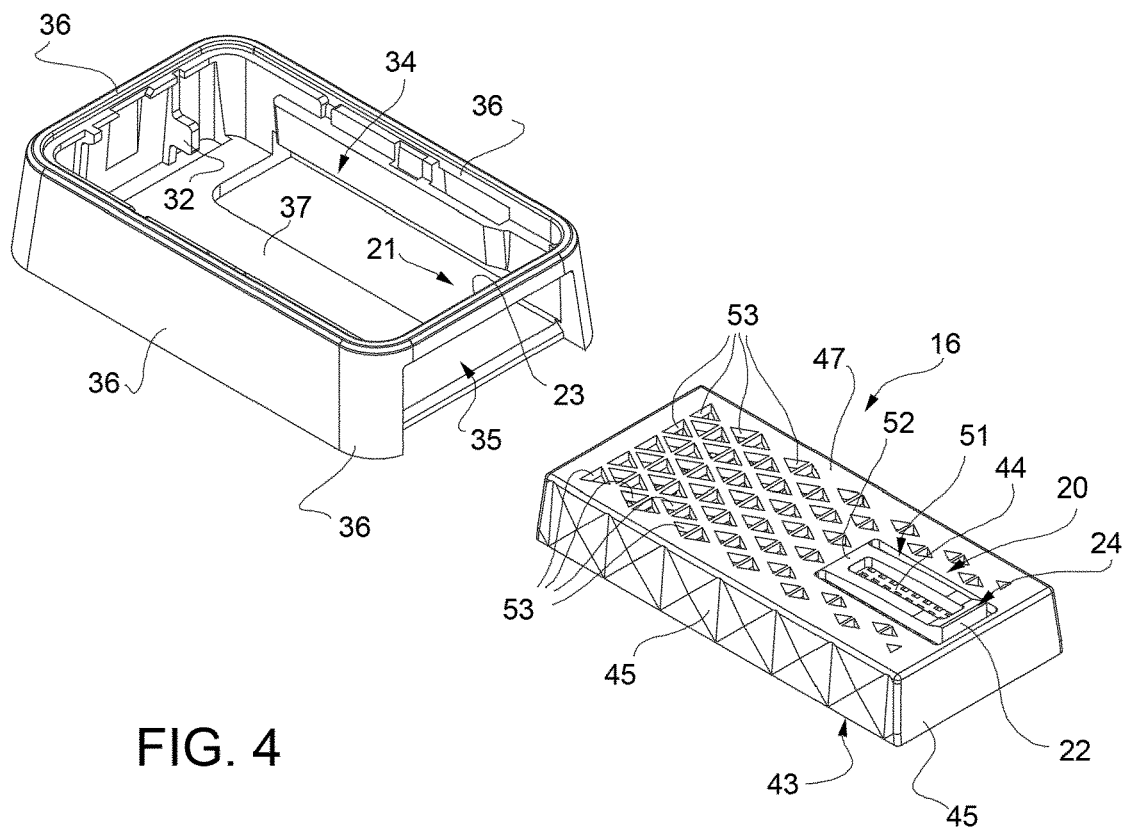
FIG. 4
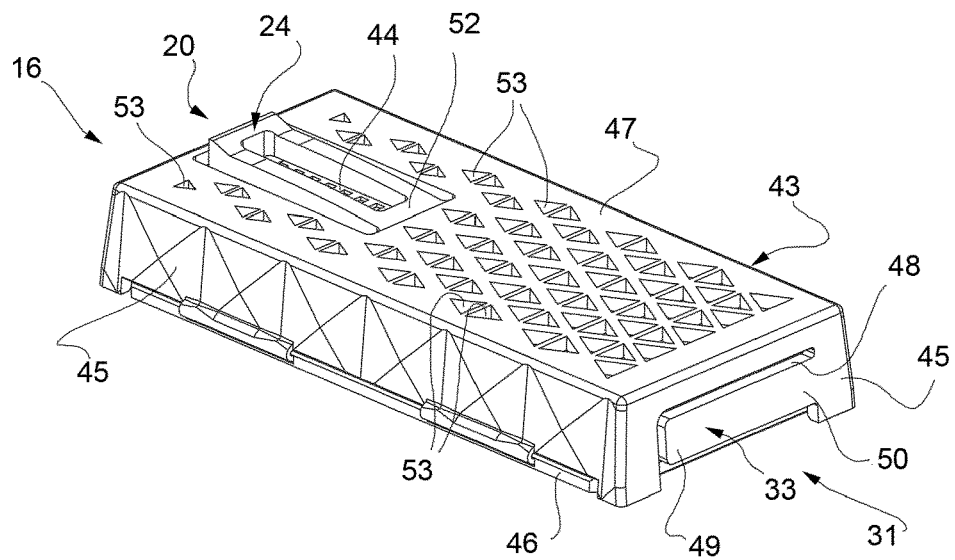

FILTER CARTRIDGE FOR A FILTER ASSEMBLY, FILTER ASSEMBLY AND DOMESTIC APPLIANCE WITH A FILTER ASSEMBLY

The present invention relates to a filter cartridge for a filter assembly having a filter housing and the filter cartridge. In particular, the present invention relates to an air filter cartridge for an air filter assembly for a domestic appliance, in particular a domestic cooling appliance.

Advantageously, the present invention also relates to a filter assembly having a filter housing and a filter cartridge being removably arranged or arrangeable within the filter housing, in particular the filter assembly being suited for a domestic appliance, in particular a domestic cooling appliance. In particular, the present invention relates to an air filter assembly for a domestic appliance, in particular a domestic cooling appliance, the air filter assembly having an air filter housing and an air filter cartridge.

Advantageously, the present invention also relates to a domestic appliance, in particular a domestic cooling appliance, even more particular a domestic refrigerator, having a filter assembly, in particular an air filter assembly.

There are known domestic appliances such as domestic refrigerators, which are used for the storage of food products. In particular, domestic refrigerators are applied so as to increase the possible storage time of the food products with respect to the putative storage times when being kept at ambient temperature.

Furthermore, a typical domestic refrigerator comprises one or more cooling chambers, which possibly may provide for different inner temperatures. E.g. there are known domestic refrigerators, which comprise a freezing chamber with an inner temperature below 0° C. and a cooling chamber with an inner temperature above 0° C.

It is also known that a typical domestic refrigerator is used not only for the storage of one kind of food product, but typically different kinds of food products are stored within the same domestic refrigerator. These different kind of food products do not only differ in their physical state and form, but also regarding e.g. their smell. There are known food products, which provide for or which may develop a characteristic smell, which may, however, disturb the quality and taste of other food products or which may simply disturb a user when accessing the domestic refrigerator.

It may also occur from time to time that a consumer stores food products within the domestic refrigerator longer than suggested, leading to the degradation of the food product and the formation of unpleasant odors, which may interfere with the taste and quality of other food products and which may disturb a consumer assessing the domestic refrigerator.

Furthermore, it is known that food products such as fruits and vegetables may release ethylene, which may again enhance the maturing process of other food products.

In addition, it is also known that the organoleptic properties of food products may alter due to oxidation processes.

Therefore, in the recent years, filter assemblies have been proposed to be placed within the domestic refrigerator for reducing the above-mentioned inconveniencies. E.g. there are known filter assemblies, which are loosely placed within the domestic refrigerator or which are removably attached to an inner wall of the domestic refrigerator. These filter assemblies loose efficiency with time and, thus, have to be replaced from time to time. Typically exchange frequencies range between 3 to 6 months.

Even though the application of such filter assemblies has provided for improvements with regard to the above-mentioned inconveniencies, they still come along with some drawbacks. E.g. the filter assemblies being loosely arranged within the domestic refrigerator can freely move within the domestic refrigerator, which may lead to the creation of inconveniences when placing the food products within the domestic refrigerator. As well, it has been found that when using more than one filter assembly, the consumer may loose track on which filter assembly has been placed within the domestic refrigerator before the other one. With respect to the filter assemblies, which are attached to the inner walls, it has been found that they may detach from the inner walls during their lifetime.

Thus, a need is felt in the sector to improve the known filter assemblies so as to overcome at least one of the above-mention drawbacks.

One aim of the present invention is to provide for a filter cartridge of a filter assembly, to overcome, in a straightforward manner, at least one of the aforementioned drawbacks.

Another aim of the present invention is to provide for a filter assembly to overcome, in a straightforward manner, at least one of the aforementioned drawbacks.

Another aim of the present invention is to provide for a domestic appliance to overcome, in a straightforward manner, at least one of the aforementioned drawbacks.

According to the present invention, there is provided an air filter cartridge for an air filter assembly for a domestic appliance.

According to the present invention there is provided a filter cartridge for a filter assembly.

According to the present invention there is provided a filter assembly.

According to the present invention there is also provided a domestic appliance.

In addition, according to the present invention, there is provided an air filter cartridge for an air filter assembly for a domestic appliance, in particular for a domestic cooling appliance, even more particular for a domestic refrigerator, the filter cartridge comprising a spring element being arranged at a first wall of the filter cartridge and a moveable element being arranged at a second wall of the filter cartridge being transversal, in particular orthogonal, to the first wall. In particular, the spring element and the moveable element allow to interact with respective and distinct portions of the filter assembly so as to allow for specific functions associated to the spring element and the moveable element.

Preferentially but not necessarily, the spring element is integral to the first wall and/or the second moveable element is integral to the second wall. In this way, a simple construction of the filter cartridge is obtained and no further means of fixing the spring element and/or the moveable element are required.

According to a preferred non-limiting embodiment, the moveable element is configured to move between at least two positions, in particular at which the moveable element is configured to respectively interact with a respective portion of the filter assembly and to release the interaction. In this way, it is possible to control the interaction of the moveable element with the respective portion of the filter assembly by controlling the moveable element between the two positions.

According to a preferred non-limiting embodiment, the spring element is configured to exert a force into a first direction and the moveable element is moveable into a second direction, the second direction being transversal, in particular orthogonal to the first direction.

Preferentially but not necessarily, the moveable element is biased into the position at which the moveable element is configured to interact with the respective portion of the filter assembly. In particular, the moveable element is moveable into the second position by means of a user.

According to a preferred non-limiting embodiment, the spring element is controllable into an active configuration at which the spring element is loaded and an inactive configuration at which the spring element is free of any loaded force. In particular, the spring element is configured to be controlled from the inactive configuration into the active configuration by means of interaction with a respective portion of the filter assembly. Even more particular, when the filter cartridge is separated from other portions of the filter assembly distinct from the filter cartridge, the spring element is controlled in its inactive configuration and when the filter cartridge is brought into contact with the other portions of the filter assembly, the spring element is controlled in the active configuration. In such a manner, it is possible to define a force acting on the filter cartridge, which is thought to facilitate the removal of the filter cartridge form the other portions of the filter assembly.

According to a preferred non-limiting embodiment, the spring element comprises and/or is defined by a bendable plate reversibly controllable into a non-bent position and a bent position, in particular at which the spring element is controlled at respectively its inactive configuration and active configuration. In this way, an efficient construction of the spring element is obtained, which can be easily arranged and/or provided for at the respective first wall.

Preferentially but not necessarily, the spring element is defined and/or determined and/or obtained by providing for a recess within the first wall. Such a solution allows for an easy way on how to construct the spring element.

According to a preferred non-limiting embodiment, the air filter cartridge comprises an enclosure carrying the spring element and the moveable element and a filter element arranged within the enclosure. In particular, the enclosure comprises the first and the second wall. In this way, it is possible to distinguish the structural element defining the extensions of the air filter cartridge and the active element, which results in the actual filtering activity of the air filter cartridge.

Preferentially but not necessarily, a cross-section of the enclosure presents a trapezoidal shape. In this manner, it is possible to define a preferred orientation of the air filter cartridge, in particular in collaboration with other portions of the air filter assembly.

Preferentially but not necessarily, the enclosure comprises a plurality of lateral walls, a base wall and a cover wall delimiting an inner space of the filter cartridge.

Preferentially but not necessarily, the base wall and/or the cover wall is/are hinged each to one respective lateral wall for allowing to access the inner space. In this way, it is possible to access the inner space and to replace the filter element.

Preferentially but not necessarily, the cover wall defines and/or comprises the second wall and/or one lateral wall defines and/or comprises the first wall. In particular, the moveable element is hinged to the cover wall and/or the spring element is hinged to the respective lateral wall. In this way, an easy way of obtaining the specific functions associated to the spring element and/or the moveable element are obtained.

According to a preferred non-limiting embodiment, the spring element defines a portion of an expelling device of the filter assembly and the moveable element defines a portion of a locking device of the filter assembly.

Preferentially but not necessarily, the filter assembly comprises also a filter housing and the filter cartridge is removably placeable within the filter housing. In particular, the spring element is configured to interact with a portion of the filter housing in order to exert an expelling force onto the filter cartridge and the moveable element is configured to interact with another portion of the filter housing for blocking the filter cartridge within the filter housing and to counter-act the expelling force. In such a manner, an easy mechanism is provided to allow on the one side for a safe placement of the filter cartridge within the filter housing and on the other side to allow for an easy extraction of the filter cartridge out of the filter housing.

In addition, according to the present invention, there is provided a filter cartridge, in particular an air filter cartridge, even more particular a replaceable filter cartridge, for a filter assembly, in particular an air filter assembly, the filter assembly comprising the filter cartridge and a filter housing. The filter cartridge is (removably) placeable within the filter housing and comprises a spring element configured to interact with a portion, in particular an inner portion and/or a control element, of the filter housing and to exert an expelling force on the filter cartridge out of the filter housing when being placed within the filter housing. The filter cartridge also comprises a first interaction element controllable into a locking position at which the first interaction element is configured to interact with a second interaction element of the filter housing for blocking the filter cartridge within the filter housing and/or for counter-acting against the expelling force and an unlocking position at which the interaction between the first interaction element and the second interaction element is released and/or loosened for allowing the expelling force to at least partially expel the filter cartridge from the filter housing.

Such a filter cartridge allows at one side for a safe and reliable arrangement of the filter cartridge within the filter housing and an easy removal of the filter cartridge from the filter housing. This also means that the position of the filter assembly is not subject to any changes. These advantages are obtained by providing on the one side for a spring element, which would direct the filter cartridge out of the filter housing if it was not for the first interaction element. The removal of the filter cartridge is easily achievable by controlling the first interaction element from the locking position to the unlocking position.

Preferentially but not necessarily, the filter assembly is suited for use in a domestic appliance, in particular a domestic cooling appliance, such as a domestic refrigerator or similar.

According to a preferred non-limiting embodiment, the spring element is controllable into an active configuration at which the spring element is configured to exert the expelling force. The spring element is designed to be controlled into the active configuration through interaction with a portion of the filter housing and with the filter cartridge being arranged within the filter housing. This allows to provide for an efficient manner of loading the spring element and to guarantee that the filter cartridge will be expelled when needed.

According to a preferred non-limiting embodiment, the spring element is defined by and/or comprises a bendable plate reversibly controllable into a non-bent position and a bent position. By providing for a bendable plate being reversibly bendable, it is possible to repeatedly introduce and remove the same filter cartridge into the filter housing without losing the functionality of the filter cartridge. Such a preferred non-limiting embodiment, also allows for an easy construction of the spring element and the presence of a controlled expelling force.

According to a preferred non-limiting embodiment, the bendable plate is controllable into the bent position through a control element associated to the filter housing and when being arranged within the filter housing. In such a manner it is guaranteed that upon insertion of the filter cartridge into the filter housing the bendable plate will be loaded.

According to a preferred non-limiting embodiment, the first interaction element is biased into the locking position. In such a manner, it is guaranteed that the expelling force will be automatically counter-acted once the filter cartridge is arranged within the filter housing. A user needs to control the first interaction element into the unlocking position so as to obtain the expelling of the filter cartridge.

According to a preferred non-limiting embodiment, the first interaction element comprises a first engagement surface configured to abut as a result of the expelling force against a second engagement surface of the second interaction element for blocking the filter cartridge within the filter housing. This ensures an efficient manner of securing the filter cartridge within the filter housing.

According to a preferred non-limiting embodiment, the first interaction element comprises an active portion carrying the first engagement surface and being moveable between an extracted position and a retracted position. In this manner, it is possible to control the position of the first engagement surface, in particular for possibly disengaging the first engagement surface from the second engagement surface by moving the active portion from the extracted position to the retracted position.

According to a preferred non-limiting embodiment, the filter cartridge further comprises an enclosure carrying the spring element and the first interaction element and a filter element arranged within the enclosure.

According to a preferred non-limiting embodiment, the spring element and/or the first interaction element are integral to the enclosure. In this way, a simple construction of the filter cartridge is obtained and no further means of fixing the spring element and/or the first interaction element are required.

In addition, according to the present invention, there is provided a filter assembly comprising a filter housing and a removable filter cartridge arranged and/or arrangeable within the filter housing. The filter assembly comprises:
  an expelling device configured to exert an expelling force onto the filter cartridge when being arranged within the filter housing for at least partially directing the filter cartridge out of the filter housing; and
  a control device controllable into a locking configuration for blocking the filter cartridge within the filter housing and/or for counter-acting against the expelling force and an unlocking configuration for allowing the expelling force to at least partially expel the filter cartridge from the filter housing.

The control device comprises at least the first interaction element and the second interaction element interacting with one another with the control device being controlled into the locking configuration.

The interaction between the first interaction element and the second interaction element is interrupted with the control device being controlled into the unlocking configuration.

The filter cartridge is provided with the first interaction element and the filter housing is provided with the second interaction element.

Such a filter assembly allows on the one side to secure the replaceable filter cartridge within the filter housing and on the other side to easily remove the filter cartridge from the filter housing if needed and by simply controlling the control device so that a force acting against the expelling force exerted by the expelling device is present or is released.

According to a preferred non-limiting embodiment, the first interaction element is moveable between the locking position and the unlocking position at which the control device is controlled at respectively the locking configuration and the unlocking configuration. I.e. the position of the first interaction element defines the configuration of the control device and the control is achieved by means of the unlocking device. In particular, with the first interaction element being controlled at the locking configuration the first interaction element is adapted to and/or interacts with the second interaction element.

Preferentially but not necessarily, the first interaction element is biased into the locking position. I.e. in the absence of the application of a specific force on the first interaction element, the first interaction element is arranged at the locking position. In this manner, it is guaranteed that the filter cartridge is blocked within the filter housing in the absence of any (unlocking) force acting on the first interaction element. This also means that it is required to apply a (unlocking) force in order to control the first interaction element into the unlocking position.

According to a preferred non-limiting embodiment, the first interaction element comprises a first engagement surface configured to abut, in particular because of the expelling force, against a second engagement surface of the filter housing for blocking the filter cartridge within the filter housing. In particular, the first interaction element comprises an active portion carrying the first engagement surface and being moveable between an extracted position and a retracted position. In this manner, it is possible to control the position of the first engagement surface, in particular for possibly disengaging the first engagement surface from the second engagement surface by moving the active portion from the extracted position to the retracted position. In particular, by disengaging the first engagement surface from the second engagement surface the extraction force will result in the at least partial expelling of the filter cartridge from the filter housing.

According to a preferred non-limiting embodiment, the filter assembly also comprises an unlocking device configured to control the control device between the locking configuration and the unlocking configuration. Preferentially but not necessarily, the unlocking device is configured to control the control device from the locking configuration to the unlocking configuration. In such a manner, the force acting against the expelling force is released by means of a control and/or manipulation of the unlocking device. This results, in use, in the expelling of the filter cartridge.

Preferentially but not necessarily, the unlocking device is controllable by a user, in particular by exerting a pressure and/or an unlocking force on the unlocking device.

According to a preferred non-limiting embodiment, the filter housing comprises the unlocking device. This allows a simple construction of the unlocking device and an easy control of the unlocking device as the filter housing is exposed to a user.

According to a preferred non-limiting embodiment, the unlocking device is configured to interact with the first interaction element.

Preferentially but not necessarily, the unlocking device is configured to move the first interaction element from the locking position to the unlocking position.

According to a preferred non-limiting embodiment, the expelling device comprises a spring element controllable into an active configuration at which the spring element is configured to exert the expelling force. In particular, the spring element is designed to be controlled into the active configuration through interaction with a control element with the filter cartridge being arranged within the filter housing. In this manner, it is ensured that the spring element exerts the expelling force, once the filter cartridge is arranged within the filter housing.

According to a preferred non-limiting embodiment, the filter housing and/or the expelling device comprises the control element, the control element being configured to interact with the spring element for controlling the spring element into the active configuration. In particular, the control element is arranged at an inner surface of the filter housing. Even more particular, the control element is arranged at an inner surface of a lateral wall of the filter housing, which is opposite to a lateral wall of the filter housing carrying an opening for allowing for the introduction and removal of the filter cartridge into and out of the filter housing. In particular, the control element protrudes from the inner surface towards the opening.

According to a preferred non-limiting embodiment, the spring element comprises and/or is defined by a bendable plate reversibly controllable into a non-bent position and a bent position, in particular at which the spring element is controlled at its respective inactive configuration and active configuration. In this way, an efficient construction of the spring element is obtained, which can be easily arranged and/or provided for at the respective lateral wall.

Preferentially but not necessarily, the spring element is defined and/or determined and/or obtained by providing for a recess within the respective lateral wall. Such a solution allows for an easy way on how to construct the spring element.

Preferentially but not necessarily, the bendable plate is configured to exert the expelling force when being controlled into the bent position by interaction with the control element associated to the filter housing.

According to a preferred non-limiting embodiment, the control element is configured to interact with the bendable plate.

Preferentially but not necessarily, the control element is configured to interact with the bendable plate such that the bendable plate is controlled into the bent positon with the filter cartridge being arranged within the filter housing. This allows to guarantee that the expelling force acts on the filter cartridge once the filter cartridge has been inserted and/or introduced into the filter housing.

According to a preferred non-limiting embodiment, the air filter cartridge comprises an enclosure carrying the spring element and the first interaction element and a filter element arranged within the enclosure. In this way, it is possible to distinguish the structural element defining the extensions of the air filter cartridge and the active element, which results in the actual filtering activity of the air filter cartridge.

Preferentially but not necessarily, the spring element and the first interaction element are integral to the enclosure. This allows to produce the filter cartridge in a simplified manner.

According to a preferred non-limiting embodiment, the filter housing comprises an inner space for housing the filter cartridge and an opening allowing for the introduction and removal of the filter cartridge into and from the inner space. The inner space and/or the opening and the filter cartridge, in particular the enclosure, are shaped such that introduction of the filter cartridge into the filter housing is available only according to one specific determined and/or defined orientation of the filter cartridge. This means that a user is assisted in the determination of the correct orientation of the filter cartridge so that the expelling device and the control device operate correctly.

Preferentially but not necessarily, a cross-section of the enclosure and a cross-section of the opening present a trapezoidal shape. In this manner, it is possible to define a preferred orientation of the filter cartridge, in particular in collaboration between the filter cartridge and the filter housing, in particular the opening.

In addition, according to the present invention, there is provided a domestic appliance, in particular a domestic cooling appliance, even more particular a domestic refrigerator, comprising at least one filter assembly.

According to a preferred non-limiting embodiment, the filter housing of the filter assembly is integral and/or fixedly secured to at least a portion of the domestic appliance. In this way, a fixed and secured position of the filter assembly is ensured.

A non-limiting embodiment of the present invention will now be described, by way of example, with reference to the accompanying drawings, in which:

FIG. 3 is an exploded view of the filter assembly of FIGS. 1 and 2, with parts removed for clarity;

FIG. 4 is a perspective view of a detail of the filter assembly of FIGS. 1, 2 and 3, with parts removed for clarity;

Figure 1:
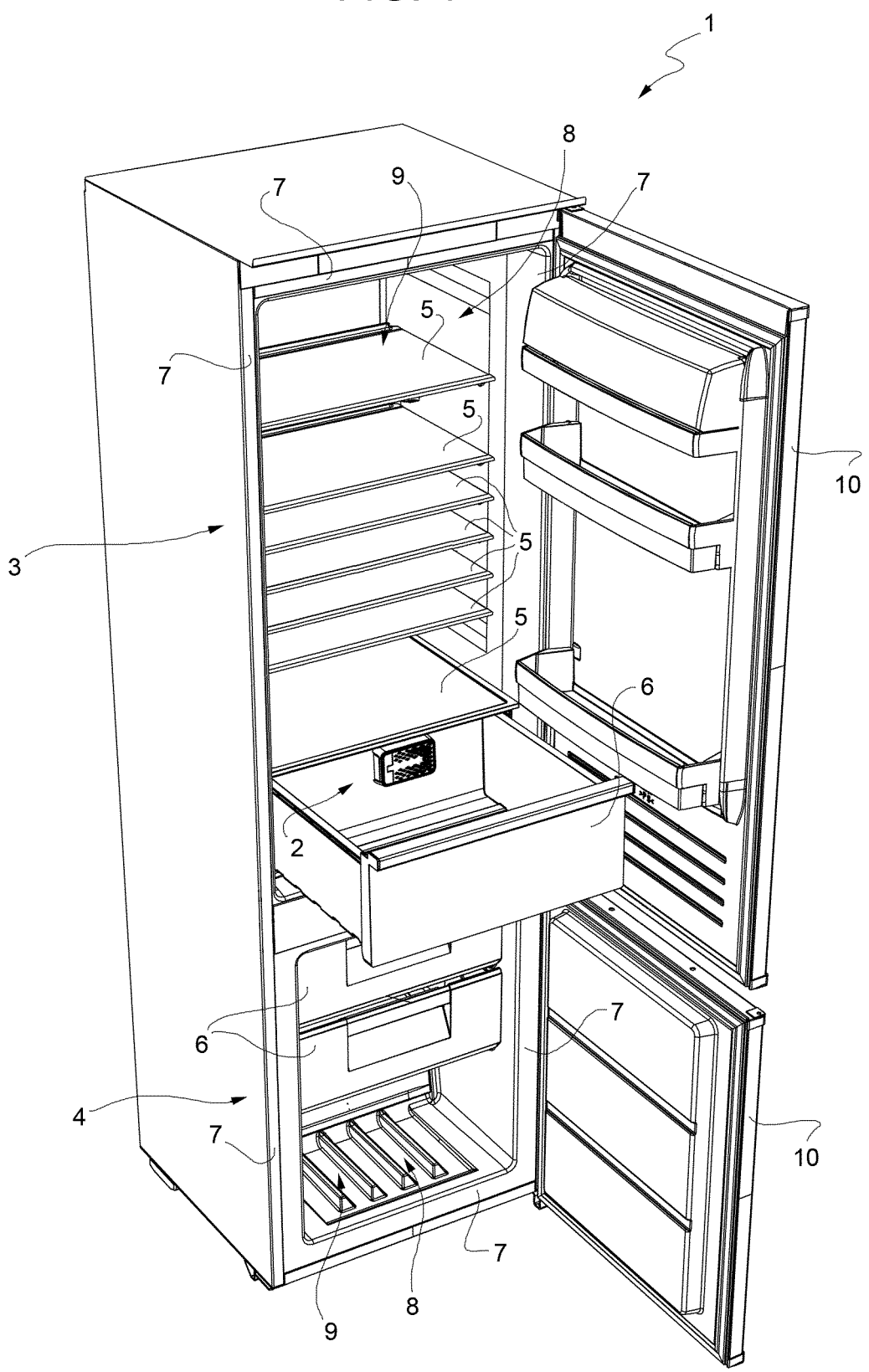
FIG. 1 is a schematic illustration of a domestic appliance comprising a filter assembly according to the present invention, with parts removed for clarity.
Figure 7:
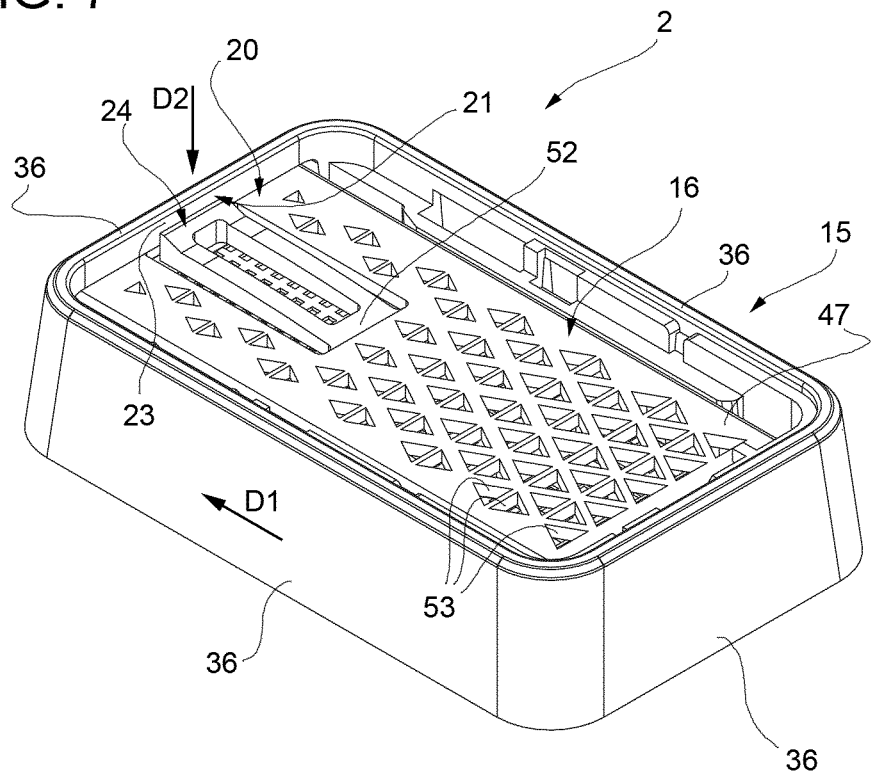
Figure 2:
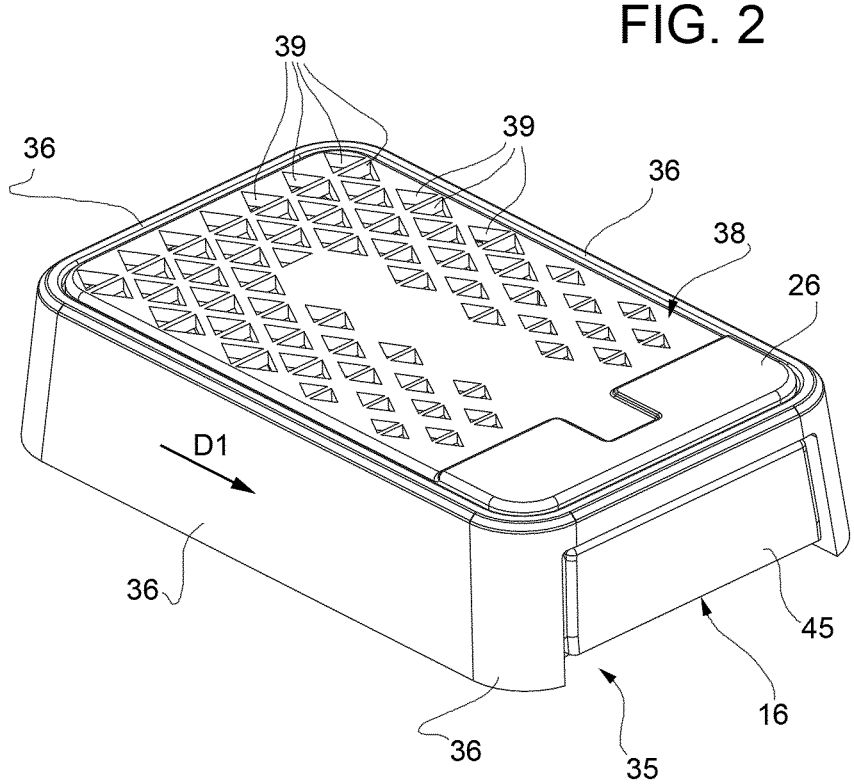
FIG. 2 is a perspective view of the filter assembly of Figure, with parts removed for clarity.
Figure 5:
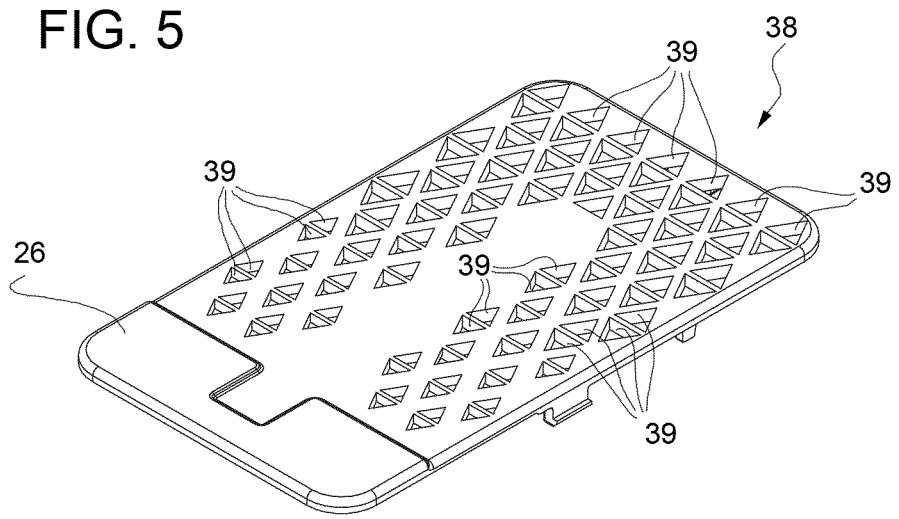
Figure 6:
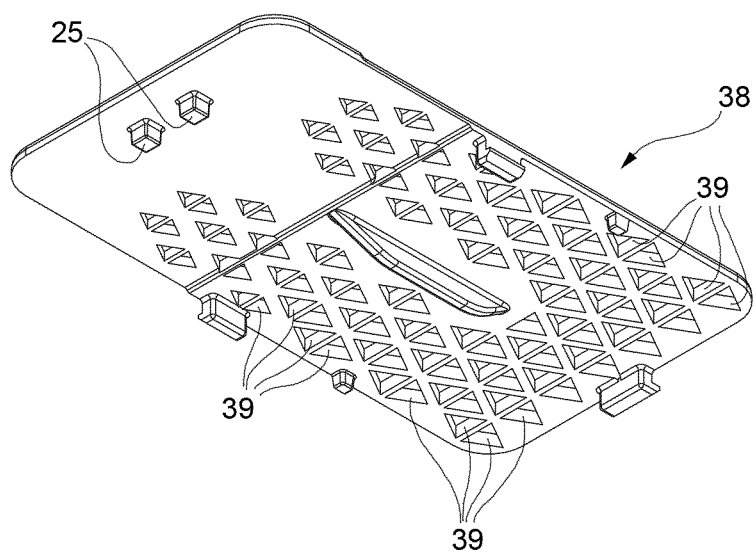

FIGS. 5 and 6 are different perspective views of another detail of the filter assembly of FIGS. 1, 2 and 3, with parts removed for clarity; and FIG. 7 is a perspective view of an even other detail of the filter assembly of FIGS. 1, 2 and 3, with parts removed for clarity.

With reference to FIG. 1, number 1 indicates as a whole a domestic appliance, in particular a domestic refrigerator, comprising a filter assembly 2, in particular an air filter assembly 2, the filter assembly 2 being adapted to filter gas, in particular air, in particular within domestic appliance 1.

According to a preferred non-limiting embodiment, filter assembly 2 is configured to filter air, in particular to at least absorb odors and/or ethylene and/or is configured to at least provide for an antibacterial and/or an antioxidant action.

According to a preferred non-limiting embodiment, domestic refrigerator 1 comprises at least a first cooling chamber 3, in particular also a second cooling chamber 4. In particular, each one of cooling chambers 3 and 4 being configured to host food products at a defined and/or determined inner temperature.

According to a preferred non-limiting embodiment, domestic refrigerator 1 comprises a cooling unit (not shown and known as such) configured to selectively control the temperature within cooling chamber 3 and/or 4. In particular, the cooling unit is configured to control a temperature above 0° C. within cooling chamber 3 and a temperature below 0° C. within cooling chamber 4.

Preferentially but not necessarily, domestic refrigerator 1 also comprises one or more shelves 5 and/or one or more crisper drawers 6, each one being arranged within one respective of cooling chamber 3 and cooling chamber 4.

According to a preferred non-limiting embodiment, each one of cooling chambers 3 and 4 comprises respective delimiting walls 7 for partially delimiting one respective cooling space 8 and defining a respective opening 9 for allowing the introduction and the removal of products, in particular food products, into and from the respective cooling space 8.

According to a preferred non-limiting embodiment, domestic refrigerator 1 also comprises at least one door 10 for selectively opening and closing at least one cooling space 8. According to the non-limiting embodiment shown, domestic refrigerator 1 comprises two doors 10, one associated to cooling chamber 3 and the other one associated to cooling chamber 4 for independently opening and closing the respective cooling space 8.

With particular reference to FIG. 1, filter assembly 2 is associated to cooling chamber 3, in particular to one crisper drawer 6 arranged within cooling chamber 3. In alternative, filter assembly 2 could be associated to one shelf 5 or to a respective inner surface of one delimiting wall 7. In alternative, filter assembly 2 may also be associated to cooling chamber 4 instead to cooling chamber 3.

It should be noted that domestic refrigerator 1 may also comprise more than one filter assembly 2.

Preferentially but not necessarily, each one of cooling chambers 3 and 4 comprises at least one filter assembly 2.

With particular reference to FIGS. 2, 3 and 7, filter assembly 2 comprises a filter housing 15, in particular an air filter housing 15, and a filter cartridge 16, in particular an air filter cartridge 16, removably arranged and/or removably arrangeable within filter housing 15.

With particular reference to FIG. 1 and according to a preferred non-limiting embodiment, filter housing 15 is fixed and/or mounted and/or attached to a portion, in particular an inner surface, of domestic refrigerator 1. In the example shown in FIG. 1, filter housing 15 is attached to a surface of one crisper drawer 6.

In particular, this allows to define and/or determine the location of filter assembly 2 within domestic refrigerator 2.

According to a possible embodiment, filter housing 15 is integral to and/or fixedly secured to, a portion of domestic refrigerator 1, in the case shown integral to one crisper drawer 6. In particular, to be integral and/or fixedly secured means that filter housing 15 cannot be removed from the respective portion. E.g. in the specific case shown in FIG. 1, filter housing 15 cannot be removed from the respective crisper drawer 6.

In alternative, filter housing 15 could be a separate piece being (removably) attached to domestic refrigerator 1.

Advantageously and with particular reference to FIGS. 2 to 7, filter assembly 2 further comprises:
an expelling device configured to exert an expelling force, in particular the expelling force acting into a first direction D1, onto filter cartridge 16 when filter cartridge 16 is arranged within filter housing 15 for at least partially directing filter cartridge 16 out of filter housing 15; and
a control device controllable into at least a locking configuration for blocking filter cartridge 16 within filter housing 15 and/or for counter-acting against the expelling force and an unlocking configuration for allowing the expelling force to at least partially expel filter cartridge 16 from filter housing 15.

In particular, it is to be noted that the control device when being controlled in the locking configuration impedes the expelling device to exert its function to expel filter cartridge 16 from filter housing 15 and, only, with the control device being controlled into the unlocking configuration, the expelling device is adapted to at least partially expel filter cartridge 16 from filter housing 15.

In particular, it should be further noted that while the control device is controllable between at least the locking and unlocking configurations, the expelling device is automatically active after the introduction of filter cartridge 16 into filter housing 15. Thus, the expelling force acts on filter cartridge 16, even though filter cartridge 16 is impeded from exiting from filter housing 15 due to the control device being in the locking configuration.

In this way, it is guaranteed that filter cartridge 16 remains blocked within filter housing 15 and a controlled removal of filter cartridge 16 from filter housing 15 is possible due to the control device.

According to a preferred non-limiting embodiment, the control device is biased into the locking configuration.

According to a preferred non-limiting, filter assembly 2 also comprises an unlocking device 19 configured to control the control device between the locking configuration and the unlocking configuration.

Preferentially but not necessarily, unlocking device 19 is configured to control, in use upon activation of unlocking device 19 itself, control device from the locking configuration to the unlocking configuration. In other words, upon activation of unlocking device 19 it is possible to deactivate the control device (to control the control device into the unlocking configuration) so that the expelling device is adapted to expel filter cartridge 16.

Advantageously, the control device comprises at least a first interaction element 20 and a second interaction element 21 being configured to interact and/or interacting with one another with the control device being controlled into the locking configuration, and in particular with filter cartridge 16 being arranged within filter housing 15, and first interaction element 20 and second interaction element 21 are configured such that the interaction between first interaction element 20 and second interaction element 21 is interrupted and/or released with the control device being controlled into the unlocking configuration (i.e. the interaction between first interaction element 20 and second interaction element 21 is interrupted and/or released with the control device being controlled into the unlocking configuration so that the expelling device is not further hindered to expel filter cartridge 16).

Advantageously, filter cartridge 16 carries and/or comprises first interaction element 20 and filter housing 15 is provided with and/or carries and/or comprises second interaction element 21.

Preferentially but not necessarily, filter cartridge 16 comprises a moveable element defining and or comprising first interaction element 20 and being (moveably) arranged at a respective wall of filter cartridge 16 itself.

Preferentially but not necessarily, first interaction element 20 is integral to filter cartridge 16 and/or second interaction element 21 is integral to filter housing 15.

According to a preferred non-limiting embodiment, first interaction element 20 is moveable between a locking position and an unlocking position at which the control device is controlled into respectively the locking configuration and the unlocking configuration.

Preferentially but not necessarily, first interaction element 20 is moveable into a second direction D2 transversal, in particular perpendicular, to direction D1.

Preferentially but not necessarily, first interaction element 20 is biased into the locking position.

According to a preferred non-limiting embodiment, unlocking device 19 is configured to interact with first interaction element 20, even more particular unlocking device 19 is configured to (be activated by an user) for moving first interaction element 20 from the locking position to the unlocking position.

According to a preferred non-limiting embodiment, first interaction element 20 comprises a first engagement surface 22 and second interaction element 21 comprises a second engagement surface 23. In particular, first engagement surface 22 is configured, in particular with filter cartridge 16 being introduced into filter housing 15 and when being controlled into the locking configuration, to abut, as a result of the expelling force, against second engagement surface 23 for blocking filter cartridge 16 within filter housing 15.

Preferentially but not necessarily, unlocking device 19 is configured to disengage first engagement surface 22 from second engagement surface 23 for controlling the control device from the locking configuration into the unlocking configuration.

According to a preferred non-limiting embodiment, first interaction element 20 has an active portion 24 carrying first engagement surface 22 and being moveable between an extracted position and a retracted position at which first interaction element 20 is arranged at respectively the locking position and the unlocking position (and the control device at respectively the locking configuration and the unlocking configuration).

Preferentially but not necessarily, active portion 24 is biased into the extracted position.

Preferentially but not necessarily, unlocking device 19 is configured to move active portion 24 from the extracted position to the retracted position.

With particular reference to FIGS. 2, 3, 5 and 6, unlocking device 19 comprises one or more, in the specific case shown two, protrusion elements 25 configured to engage with first engagement element 20 and/or active portion 24, and to move, in particular upon activation of unlocking device 19 and movement of protrusion elements 25 themselves, first engagement element 20 from the locking position to the unlocking position and/or active portion 24 from the extracted position to the retracted position.

According to a preferred non-limiting embodiment, unlocking device 19 also comprises a control pad 26 configured to be pressed and/or handled and/or touched and/or operated by a user and being operationally connected with protrusion elements 25 for moving protrusion elements 25 upon pressing and/or handling and/or touching and/or operating control pad 26.

Preferentially but not necessarily, protrusion elements 25 are configured to move into a direction transversal, in particular substantially orthogonal, to direction D1 (and/or substantially parallel to direction D2) for moving first interaction element 20 from the locking position to the unlocking position and/or active portion 24 from the extracted position to the retracted position.

According to a preferred non-limiting embodiment, filter housing 15 comprises and/or is provided with unlocking device 19, in particular with protrusion elements 25 and/or control pad 26.

With particular reference to FIGS. 3, 4 and 7, the expelling device comprises a spring element 31, in particular an elastically deformable spring element 31, configured to exert the expelling force on filter cartridge 16. I.e. spring element 31 is configured to at least partially direct filter cartridge 16 out of filter housing 15.

According to the non-limiting embodiment shown, filter cartridge 16 is provided with and/or comprises spring element 31. In particular, spring element 31 is integral to filter cartridge 16.

Preferentially but not necessarily, spring element 31 is arranged at a respective wall of filter cartridge 16 itself. In particular, the respective wall at which spring element 31 is arranged is transversal, in particular orthogonal, to the respective wall wat which is arranged the moveable element (interaction element 20).

In alternative or in addition, filter housing 15 could be provided with and/or could comprise spring element 31.

In alternative or in addition, spring element 31 could be distinct from filter housing 15 and filter cartridge 16 and could be interposed between filter cartridge 16 and filter housing 15 with filter cartridge 16 being arranged within filter housing 15.

According to a preferred non-limiting embodiment, spring element 31 is controllable into an active configuration at which spring element 31 is configured to exert the expelling force (i.e. spring element 31 is loaded).

Preferentially but not necessarily, spring element 31 is also configured to be controllable into an inactive configuration at which spring element 31 is free of any loaded force. In particular, spring element 31 is configured such to be in the inactive configuration with filter cartridge 16 being arranged outside from filter housing 15 and is controlled into the active configuration with filter cartridge 16 being blocked within filter housing 15.

According to a preferred non-limiting element, the expelling device also comprises a control element 32 configured to interact with spring element 31 for controlling spring element 31 into the active configuration. In other words, spring element 31 is designed to be controlled into the active configuration through interaction with control element 32 and with filter cartridge 16 being arranged within filter housing 15.

According to a preferred non-limiting embodiment, spring element 31 comprises and/or is defined by a bendable plate 33 reversibly controllable into a non-bent position and a bent position. Preferentially but not necessarily, spring element 31 is arranged in the active configuration with bendable plate 33 being in the bent position, and in particular is arranged in the inactive configuration with bendable plate 33 being in the non-bent position. I.e. bendable plate 33 is configured to exert the expelling force when being controlled into the bent position.

Preferentially but not necessarily, bendable plate 33 is controllable into the bent position through interaction with control element 32 and with filter cartridge 16 being arranged within filter housing 15. In particular, bendable plate 33 is configured to bend upon interaction with control element 32.

Preferentially but not necessarily, bendable plate 33 is configured to bend along direction D1 when being controlled into the bent position and to move into a direction opposed to direction D1 when moving from the bent position to the non-bent position.

With particular reference to FIGS. 2 to 7, filter housing 15 comprises an inner space 34 for housing filter cartridge 16 and an opening 35 allowing for the introduction and removal of filter cartridge 16 into and from filter housing 15, in particular inner space 34.

According to a preferred non-limiting embodiment, second engagement surface 23 is arranged within and/or faces inner space 34.

According to a preferred non-limiting embodiment, inner space 34 and/or opening 35 and filter cartridge 16 are shaped such that introduction of filter cartridge 16 into filter housing 15, in particular inner space 34, is available only according to one specific and/or determined and/or defined orientation of filter cartridge 16.

Preferentially but not necessarily, also first interaction element 20, in particular active portion 24, is configured to partially determine and/or define the orientation with which filter cartridge 16 is to be introduced into filter housing 15, in particular inner space 34. In this way, it is ensured that a user inserts, in use, filter cartridge 16 into filter housing 15 in the correct manner so as to guarantee the correct function of the expelling device and the control device.

Preferentially but not necessarily, active portion 24 comprises one or more flanks configured to interact with a respective portion of filter housing 15 during insertion of filter cartridge 16 into filter housing 15. In particular, during insertion of filter cartridge 16 into filter housing 15, the interaction of the flanks of active portion 24 with the respective portion of filter housing 15 results in a movement of active portion 24 from the extracted to the retracted position and once filter cartridge 16 is arranged within filter housing 15, active portion 24 returns at the extracted position.

Preferentially but not necessarily, a cross-section of opening 35 and the a cross-section of filter cartridge 16 are such to define and/or determine at least partially the orientation of filter cartridge 16 within which filter cartridge 16 is required to be introduced into filter housing 15, in particular into inner space 34.

According to the specific embodiment disclosed, the cross-section of opening 35 and the cross-section of filter cartridge 16 have a trapezoidal shape.

Alternatively, the cross-sections of opening 35 and of filter cartridge 16 could have other shapes as long as these allow to define and/or determine the orientation with which filter cartridge 16 has to be introduced into filter housing 16.

With particular reference to FIGS. 2, 3 and 4 to 7, filter housing 15 comprises a plurality of lateral walls 36 partially delimiting inner space 34.

According to a preferred non-limiting embodiment, one respective lateral wall 36, in particular the respective inner surface, carries and/or comprises second engagement surface 23. In particular, second engagement surface 23 is defined by a portion of the inner surface of the respective lateral wall 36.

According to a preferred non-limiting embodiment, one respective lateral wall 36, in particular the one carrying engagement surface 23, carries and/or comprises opening 35.

Preferentially but not necessarily, opening 35 is delimited by respective rim portions of the respective lateral wall 36. In particular, one of the respective rim portions carries and/or comprises second engagement surface 23.

According to a preferred non-limiting embodiment, one respective lateral wall 36 comprises and/or carries control element 32. In particular, the respective lateral wall 36 carrying control element 32 is opposite to the one carrying and/or comprising the lateral wall 36 having opening 35.

According to a preferred non-limiting embodiment, control element 32 protrudes from the respective inner surface of the respective lateral wall 36 and into inner space 34. In particular, control element 32 protrudes towards opening 35.

Preferentially but not necessarily, control element 32 is configured to interact with one portion of bendable plate 33 and to direct the portion away from the respective inner surface of the respective lateral wall 36. In this manner, bendable plate 33 is bent by control element 32 and is loaded (i.e. spring element 31 is controlled into the active configuration).

According to a preferred non-limiting embodiment, filter housing 15 also comprises a base portion 37 being configured to be attached and/or is integral to a surface, in particular to a surface of domestic appliance 1, and a cover portion 38 being opposed to base portion 37.

According to a preferred non-limiting embodiment, lateral walls 36 are interposed between base portion 37 and cover portion 38.

Preferentially but not necessarily, base portion 37 and lateral walls 36 are fixed to one another.

Preferentially but not necessarily, cover portion 38 is removably coupled to lateral walls 36.

According to an alternative embodiment, base portion 37 could be removably coupled to lateral walls 36.

According to a preferred non-limiting embodiment, cover portion 38 carries and/or comprises unlocking device 19, in particular protrusion elements 25 and/or control pad 26.

According to a preferred non-limiting embodiment, protrusion elements 25 protrude from an inner side of cover portion 38 into inner space 34 and/or control pad 26 is arranged at an outer side of cover portion 38 opposite to the inner side. In particular inner side of cover portion 38 faces (an inner side) of base portion 37.

According to a preferred non-limiting embodiment, filter housing 15 also comprises a plurality of aeration holes 39 configured to allow for aeration of inner space 34 and/or for a gas exchange between inner space 34 and an outer space (e.g. with one respective cooling space 8).

Preferentially but not necessarily, cover portion 38 and/or base portion 37 comprise at least some of aeration holes 39. In particular, aeration holes 39 are arranged such to allow a flow of gas through the aeration holes 39 associated to cover portion 38 into inner space 34 and out of the aeration holes 39 associated to base portion 37 and vice-versa.

With particular reference to FIGS. 3, 4 and 7, filter cartridge 16 further comprises:
- an enclosure 43 carrying and/or comprising spring element 31 (and bendable plate 33) and the moveable element and/or first interaction element 20; and
- a filter element 44, in particular an air filter element 44, (only partially shown as necessary for the understanding of the present invention) arranged within enclosure 43.

According to a preferred non-limiting embodiment, filter element 44 is configured to absorb odors and/or ethylene and/or is provided with an antibacterial and/or antioxidant function.

According to a preferred non-limiting embodiment, enclosure 43 defines and/or determines the shape of filter cartridge 16.

According to a preferred non-limiting embodiment, spring element 31 (and bendable plate 33) and/or first interaction element 20 are integral to enclosure 43.

According to a preferred non-limiting embodiment, enclosure 43 comprises an internal space within which is arranged filter element 44.

According to a preferred non-limiting embodiment, enclosure 43 comprises a plurality of respective lateral walls 45, a base wall 46 and a cover wall 47, in particular delimiting the internal space.

Preferentially but not necessarily, with filter cartridge 16 being arranged within filter housing 15, base wall 46 is adjacent to and/or faces and/or contacts (an inner side of) base portion 37 and cover wall 47 is adjacent to and/or faces (an inner side) of cover portion 38.

Preferentially but not necessarily, base wall 46 and/or cover wall 47, in the particular case shown base wall 46, is or are hinged to one respective lateral wall 45 so as to allow to access the internal space. In this way, it is possible to remove filter element 44 from enclosure 43 and to exchange an exhausted filter element 44 with a new one.

According to a preferred non-limiting embodiment, one respective lateral wall 45 carries and/or comprises spring element 31 and/or bendable plate 33. Preferentially but not necessarily, spring element 31 and/or bendable plate 33 is integral to the respective lateral wall 45.

Preferentially but not necessarily, spring element 31, in particular bendable plate 33, is defined and/or determined and/or obtained by providing for a recess 48 within the respective lateral wall 45. In particular, recess 48 defines at least one free end 49 and one fixed end 50 of bendable plate 33, the free end 49 being configured to interact with control element 32. Even more particular, with filter cartridge 16 being arranged within filter housing 15, control element 32 directs free end 49 into the internal space, thereby loading spring element 31 and/or bendable plate 33.

It should be noted that the term "free" indicates that the respective portion (i.e. free end 49) presents at least one degree of freedom (i.e. free end 49 is not fixed in space, but its position can change).

Preferentially but not necessarily, recess 48 is "U"-shaped.

According to a preferred non-limiting embodiment, first interaction element 20 is arranged at, in particular is integral to, and/or is connected to cover wall 47. In particular, active portion 24 protrudes away from cover wall 47 (and from the internal space) when being arranged at the extracted position, and even more particular is at least partially arranged within the internal space when being moved to the retracted position.

According to a preferred non-limiting embodiment, first interaction element 20 is pivotable around a pivot axis and active portion 24 defines a free end of first interaction element 20. In particular, the pivot axis is defined and/or determined at a conjunction of first interaction element 20 with cover wall 47. In other words, first interaction element is hinged to cover wall 47.

It should be noted that the term "free" indicates that the free end presents at least one degree of freedom (i.e. the free end is not fixed in space, but its position can change).

According to the non-limiting embodiment shown, cover wall 47 comprises an aperture 51 within which is arranged first interaction element 20.

Preferentially but not necessarily, first interaction element 20 comprises a coupling portion 52 connected to cover wall 47, in particular at a rim portion of aperture 51. In particular, coupling portion 52 defines at least partially the pivot axis.

According to a preferred non-limiting embodiment, enclosure 43 also comprises a plurality of respective aeration holes 53 configured to allow for the aeration of the internal space. In particular, cover wall 47 and/or base wall 46 and/or lateral walls 45 comprise at least some of aeration holes 53.

Preferentially but not necessarily, the aeration holes 53 provided on cover wall 47 and the aeration holes 39 provided on cover portion 38 are aligned with one another with filter cartridge 16 being arranged within filter housing 15.

Preferentially but not necessarily, the aeration holes 53 provided on base wall 46 and the aeration holes 39 provided on base portion 37 are aligned with one another with filter cartridge 16 being arranged within filter housing 15.

In use, filter cartridge 16 when being arranged within filter housing 15 is secured by the control device, in particular by first interaction element 22 and second interaction element 21 interacting with one another, even more particular by first engagement surface 22 abutting against second engagement surface 23. Thus, an uncontrolled removal is avoided.

When a user activates unlocking device 19, filter cartridge 16 is partially expelled from filter housing 15 so that the user can remove filter cartridge 16 afterwards. The expelling is obtained through the action of the expelling device, in particular spring element 31, even more particular bendable plate 33.

When a new filter cartridge 16 is introduced into filter housing 15 (through opening 35) spring element 31, in particular bendable plate 33, is automatically loaded by interaction with control element 32 and first interaction element 20 and second interaction element 21 automatically interact within one another, in particular first engagement surface 22 and second engagement surface 23 automatically abut against one another. Thus, the user only needs to provide for the necessary force for introducing filter cartridge 16.

The advantages of filter assembly 2 according to the present invention will be clear from the foregoing description.

In particular, filter assembly 2 allows for a safe and reliable arrangement of filter cartridge 16 within filter housing 15 and an easy manner of exchanging filter cartridge 16 with a new one.

Clearly, changes may be made to filter assembly 2 and/or domestic appliance 1 without, however, departing from the scope of the present invention.

The invention claimed is:

1. An air filter cartridge for an air filter assembly of a cooling domestic appliance, the air filter cartridge comprising:
    an enclosure including a plurality of lateral walls, a base wall, and a cover wall that collectively define an inner space of the enclosure, wherein an aperture is formed in said cover wall, and wherein said plurality of lateral walls includes opposite first and second walls;
    a filter element removably disposed within said inner space;
    a spring element arranged at said first wall, wherein said cover wall is transverse to said first wall; and
    a biasing tab extending within the aperture and having opposite first and second ends, said first end being attached to the cover wall to define a pivot axis, and said second end being disposed adjacent said second wall,
    wherein said biasing tab is movable between first and second positions via said second end pivoting about said pivot axis, and wherein said biasing tab is biased into said first position.

2. The air filter cartridge according to claim 1, wherein the spring element is integral to the first wall and/or the biasing tab is integral to the cover wall.

3. The air filter cartridge according to claim 1, wherein a cross-section of the enclosure presents a trapezoidal shape.

4. The air filter cartridge according to claim 1, wherein the base wall and/or the cover wall is/are hinged to one respective lateral wall of the plurality of lateral walls for permitting access to the inner space.

5. The air filter cartridge according to claim 4, wherein the one lateral wall is the first wall; and
wherein the spring element is hinged to said first wall.

6. The air filter cartridge according to claim 1, wherein the spring element is defined and/or determined and/or obtained by providing for a recess within the first wall.

7. The air filter cartridge according to claim 1, wherein said cover wall resides on an imaginary horizontal plane, and wherein when said biasing tab is disposed in said first position, a portion of said second end extends beyond said imaginary horizontal plane in a direction outwards and away from said inner space.

8. The air filter cartridge according to claim 7, wherein when said biasing tab is in said second position, said second end of the biasing tab is positioned closer to the base wall of the enclosure than when said biasing tab is in said first position.

9. The air filter cartridge according to claim 1, wherein said spring element is a plate having opposite first and second ends, wherein said first end of the plate is connected to said first wall and wherein said second end of the plate is movable with respect to the first wall.

10. The air filter cartridge according to claim 9, wherein the plate is formed integral with the first wall.

11. The air filter cartridge according to claim 10, wherein said plate is defined by a cutout in said first wall.

12. The air filter cartridge according to claim 11, wherein said cutout is U-shaped.

13. The air filter cartridge according to claim 1, wherein said cover wall resides on an imaginary horizontal plane, wherein when said biasing tab is disposed in said first position, a portion of said second end extends beyond said imaginary horizontal plane in a direction outwards and away from said inner space, and wherein when said biasing tab is in said second position, said second end of the biasing tab is positioned closer to the base wall of the enclosure than when said biasing tab is in said first position, and
wherein said spring element is a plate formed integral with the first wall and being defined by a cutout formed in said first wall, said plate having opposite first and second ends, wherein said first end of the plate is connected to said first wall and wherein said second end of the plate is movable with respect to the first wall.

14. A filter assembly, comprising an air filter assembly, comprising a filter housing and a removable filter cartridge arranged and/or arrangeable within the filter housing, wherein the filter assembly comprises:
an expelling device configured to exert an expelling force onto the filter cartridge when being arranged within the filter housing for at least partially directing the filter cartridge out of the filter housing;
a control device controllable into a locking configuration for blocking the filter cartridge within the filter housing and/or for counter-acting against the expelling force and an unlocking configuration for allowing the expelling force to at least partially expel the filter cartridge from the filter housing; and
an unlocking device configured to control the control device between the locking configuration and the unlocking configuration, wherein the filter housing comprises the unlocking device,
wherein the control device comprises at least a first interaction element and a second interaction element interacting and/or being configured to interact with one another with the control device being controlled into the locking configuration,
wherein the first interaction element and the second interaction element are configured such that the interaction between the first interaction element and the second interaction element is interrupted and/or released with the control device being controlled into the unlocking configuration,
wherein the filter cartridge is provided with the first interaction element and the filter housing is provided with the second interaction element,
wherein the first interaction element is moveable between a locking position and an unlocking position for controlling the control device between the locking configuration and the unlocking configuration,
wherein the unlocking device is configured to interact with the first interaction element and to move the first interaction element from the locking position to the unlocking position for controlling the control device from the locking configuration to the unlocking configuration.

15. A domestic appliance, comprising at least one said filter assembly according to claim 14; wherein the filter housing is fixedly secured and/or is integral to at least a portion of the domestic appliance.

16. A refrigerator appliance comprising at least one said filter assembly according to claim 14, wherein the filter housing is fixedly secured and/or is integral to at least a portion of the refrigerator appliance.

17. A filter assembly, comprising an air filter assembly, comprising a filter housing and a removable filter cartridge arranged and/or arrangeable within the filter housing, wherein the filter assembly comprises:
an expelling device configured to exert an expelling force onto the filter cartridge when being arranged within the filter housing for at least partially directing the filter cartridge out of the filter housing; and
a control device controllable into a locking configuration for blocking the filter cartridge within the filter housing and/or for counter-acting against the expelling force and an unlocking configuration for allowing the expelling force to at least partially expel the filter cartridge from the filter housing,
wherein the control device comprises at least a first interaction element and a second interaction element interacting and/or being configured to interact with one another with the control device being controlled into the locking configuration,
wherein the first interaction element and the second interaction element are configured such that the interaction between the first interaction element and the second interaction element is interrupted and/or released with the control device being controlled into the unlocking configuration,
wherein the filter cartridge is provided with the first interaction element and the filter housing is provided with the second interaction element,
wherein the expelling device comprises a spring element controllable into an active configuration at which the spring element is configured to exert the expelling force,
wherein the spring element is designed to be controlled into the active configuration through interaction with a control element associated to the filter housing and with the filter cartridge being arranged within the filter housing, and
wherein the control element protrudes from an inner surface of the filter housing towards an opening of the filter housing and the opening allows for the introduction and removal of the filter cartridge into and out of the filter housing.

* * * * *